June 17, 1924.
F. W. BRINTNALL
AUTOMATIC UPHOLSTERY MACHINE
Filed Nov. 25, 1921
8 Sheets-Sheet 5
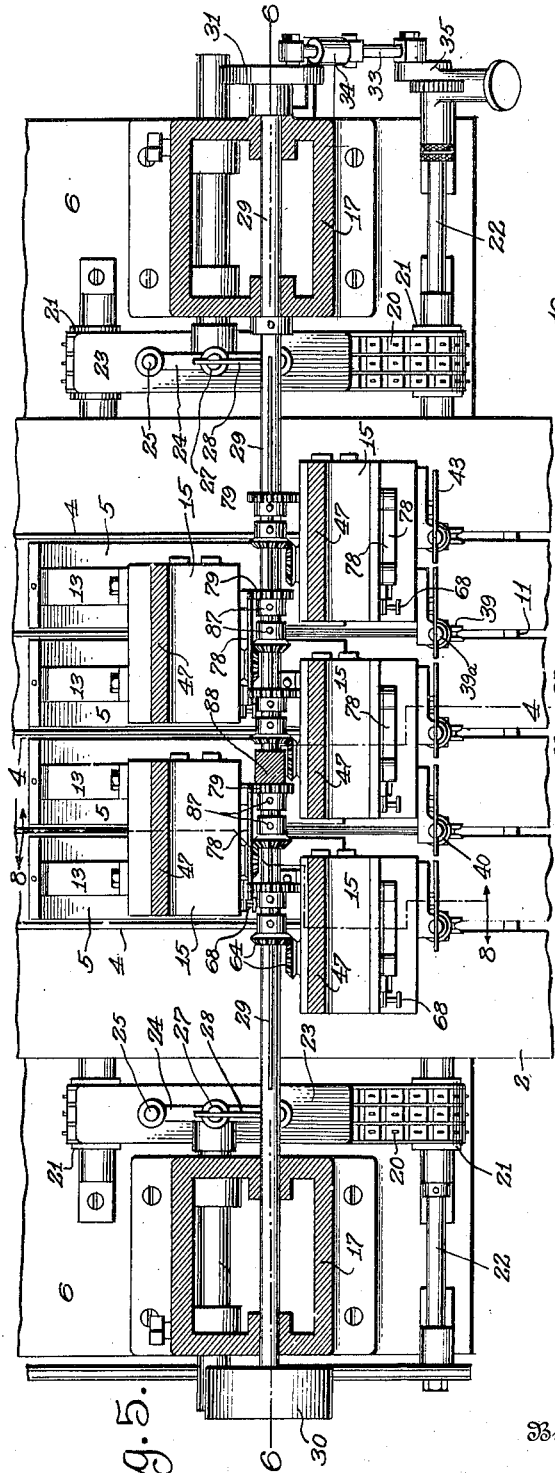
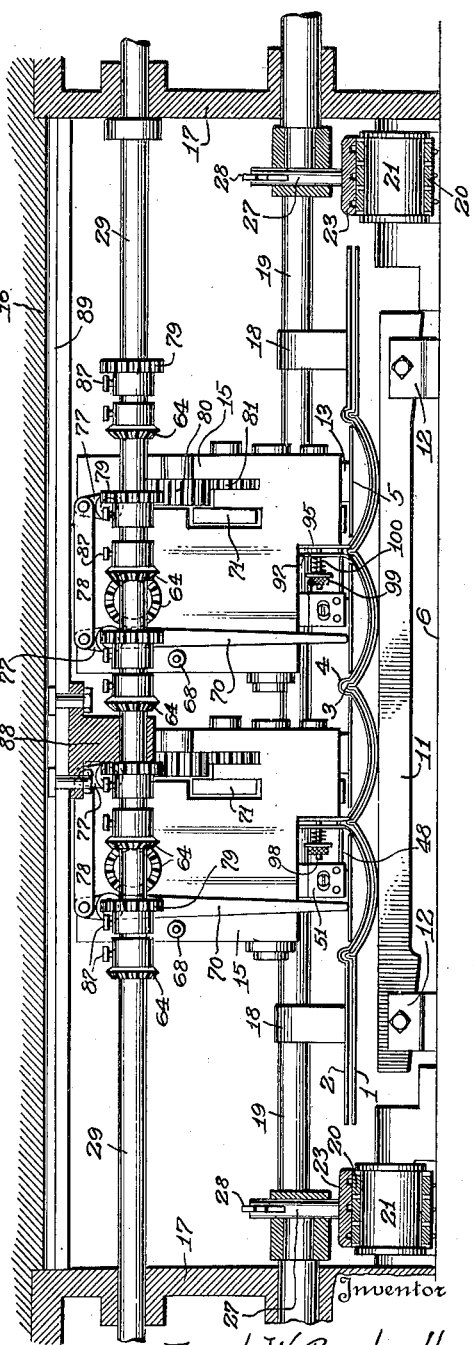
Fig. 5.
Fig. 6.
Inventor
Frank W. Brintnall,
By
Attorneys

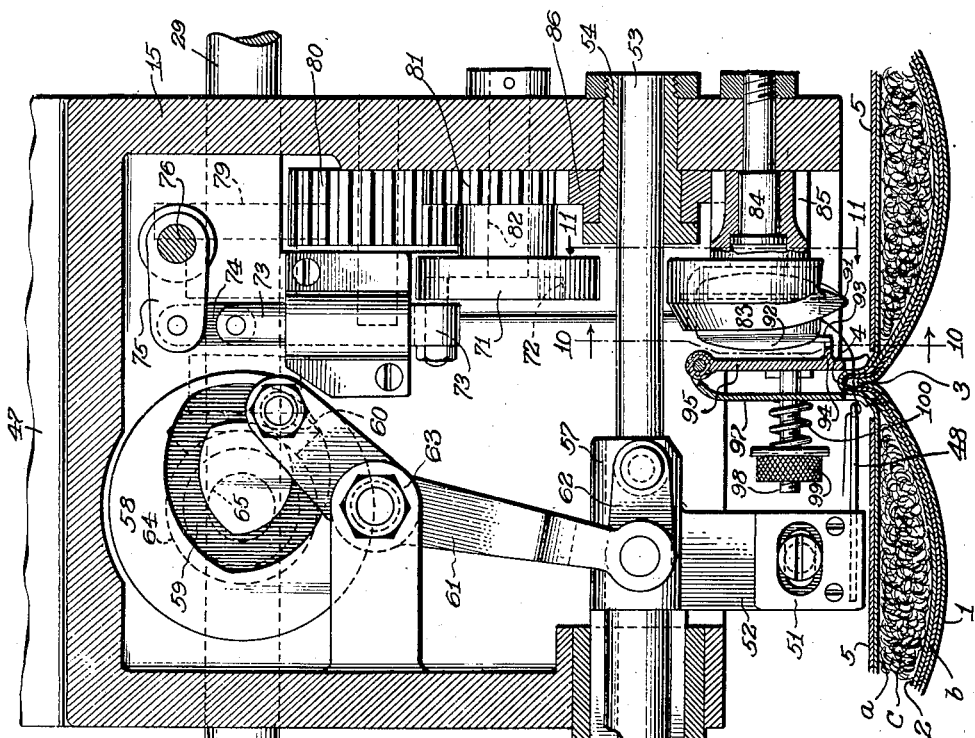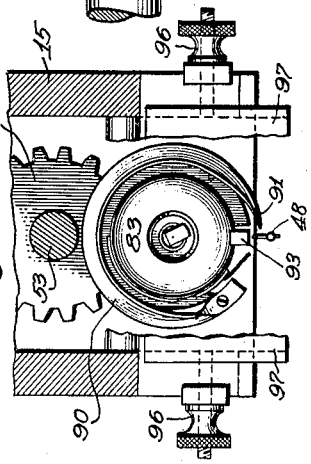

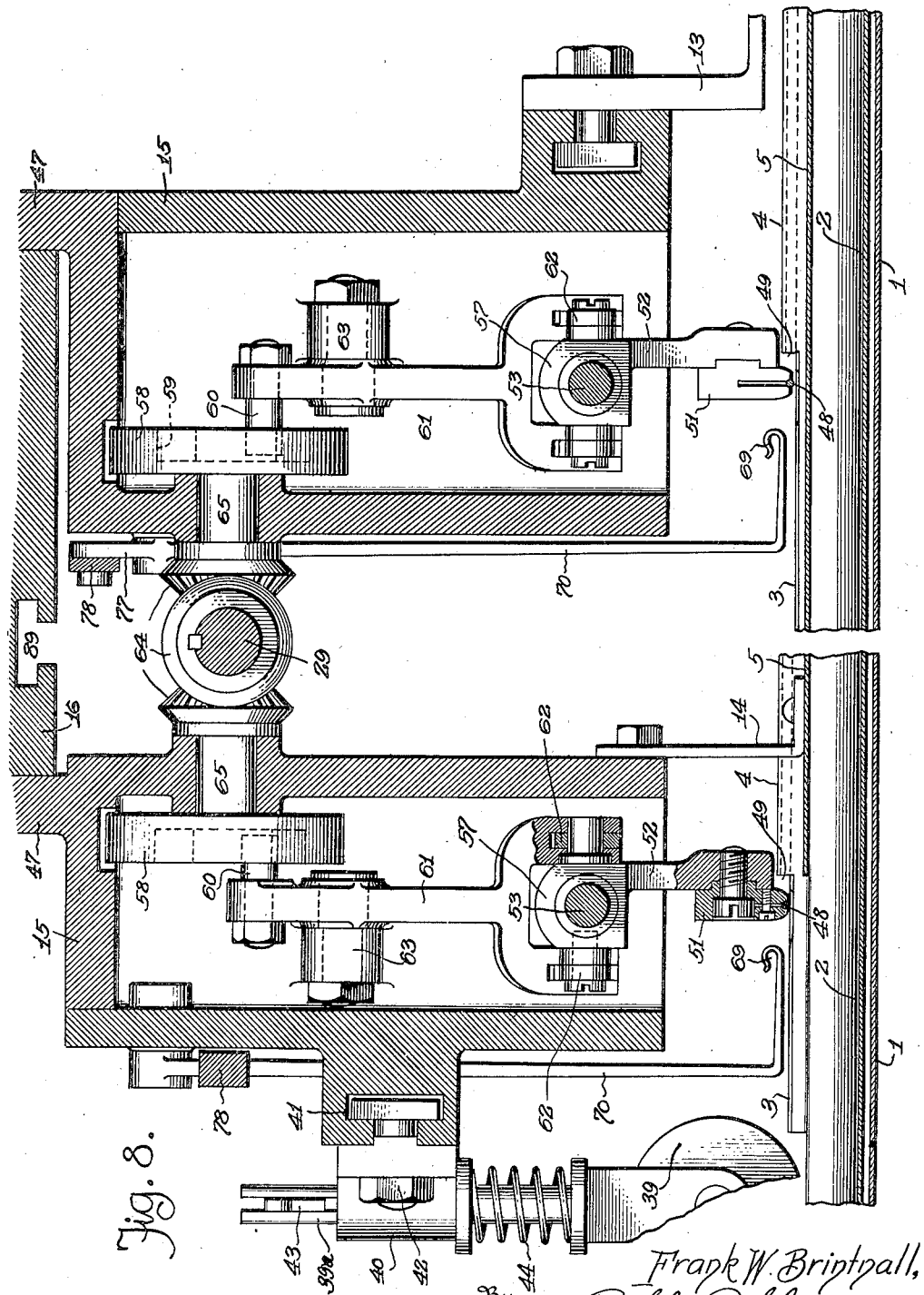

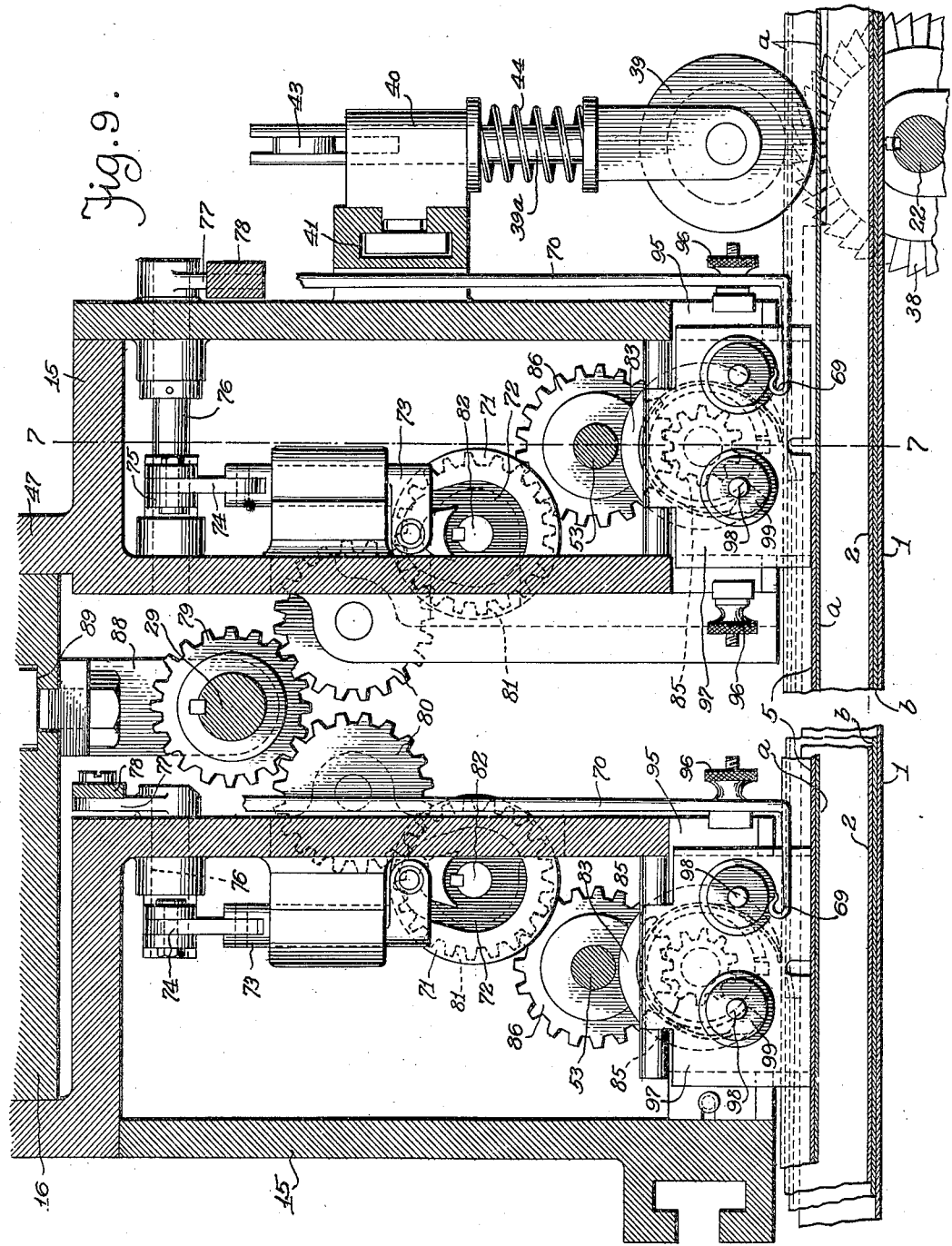

Patented June 17, 1924.

1,498,013

UNITED STATES PATENT OFFICE.

FRANK W. BRINTNALL, OF DETROIT, MICHIGAN, ASSIGNOR TO BRINTNALL MACHINE COMPANY, OF DETROIT, MICHIGAN, A CORPORATION OF MICHIGAN.

AUTOMATIC UPHOLSTERY MACHINE.

Application filed November 25, 1921. Serial No. 517,529.

*To all whom it may concern:*

Be it known that I, FRANK W. BRINTNALL, a citizen of the United States of America, residing at Detroit, in the county of Wayne and State of Michigan, have invented certain new and useful Improvements in Automatic Upholstery Machines, of which the following is a specification, reference being had therein to the accompanying drawings.

This invention relates to a machine for forming and sewing upholstery and more particularly to a machine for making what is known to the trade as "tubular" upholstery or upholstery having straight parallel tufts or padded portions extending across the entire width of the part to be covered, such as across the cushions of vehicles and other seats, and an object of the invention is to provide a machine for simultaneously forming a plurality of such tufts or tubular padded portions.

A further object is to provide suitable means for guiding padding strips to place between the fabric covering and lining of upholstery and co-operating sewing mechanism for forming seams uniting the covering and lining between the padding strips. It is also an object to so form the seams as to facilitate repair and provide a simple and efficient upholstery construction which may be assembled and sewed by machine in continuous strips of the desired width having any desired number of longitudinal parallel padded portions or tufts. A further object is to provide certain other new and useful features in the construction and arrangement whereby new and useful results are secured in the operation of the machine and in the manufacture of the product, all as hereinafter more fully described.

With the above and other ends in view, the invention consists in the matters hereinafter set forth and more particularly pointed out in the appended claims, reference being had to the accompanying drawings in which—

Fig. 1 is a rear end elevation of a machine illustrative of the invention;

Fig. 2 an enlarged end elevation of the same;

Fig. 3, a plan view with portions broken away and in section, and sewing mechanism removed;

Fig. 5 is a horizontal section substantially upon the line 5—5 of Fig. 1 showing parts of the machine in plan view;

Fig. 6 is a vertical section through a portion of the machine substantially upon the line 6—6 of Fig. 5;

Fig. 7 is an enlarged sectional detail through a sewing machine head substantially upon the line 7—7 of Fig. 9;

Fig. 8 is an enlarged vertical longitudinal section through a pair of sewing machine heads substantially upon the line 8—8 of Fig. 5 and looking toward the left;

Fig. 9 is a view similar to Fig. 8 taken substantially upon the line 8—8 of Fig. 5 and looking toward the right;

Fig. 10 is a sectional detail substantially upon the line 10—10 of Fig. 7 and showing a rotary shuttle in elevation;

Fig. 11 is a sectional detail substantially upon the line 11—11 of Fig. 7;

Fig. 12 is a cross-sectional detail of fabric and padding guides;

Fig. 13, is a longitudinal sectional detail of a portion of the guides adjacent the needle;

Fig. 14 is a perspective detail of an end portion of the guides; and

Fig. 15 is a perspective view of an end portion of finished upholstering material as manufactured by the machine.

Figure 1:
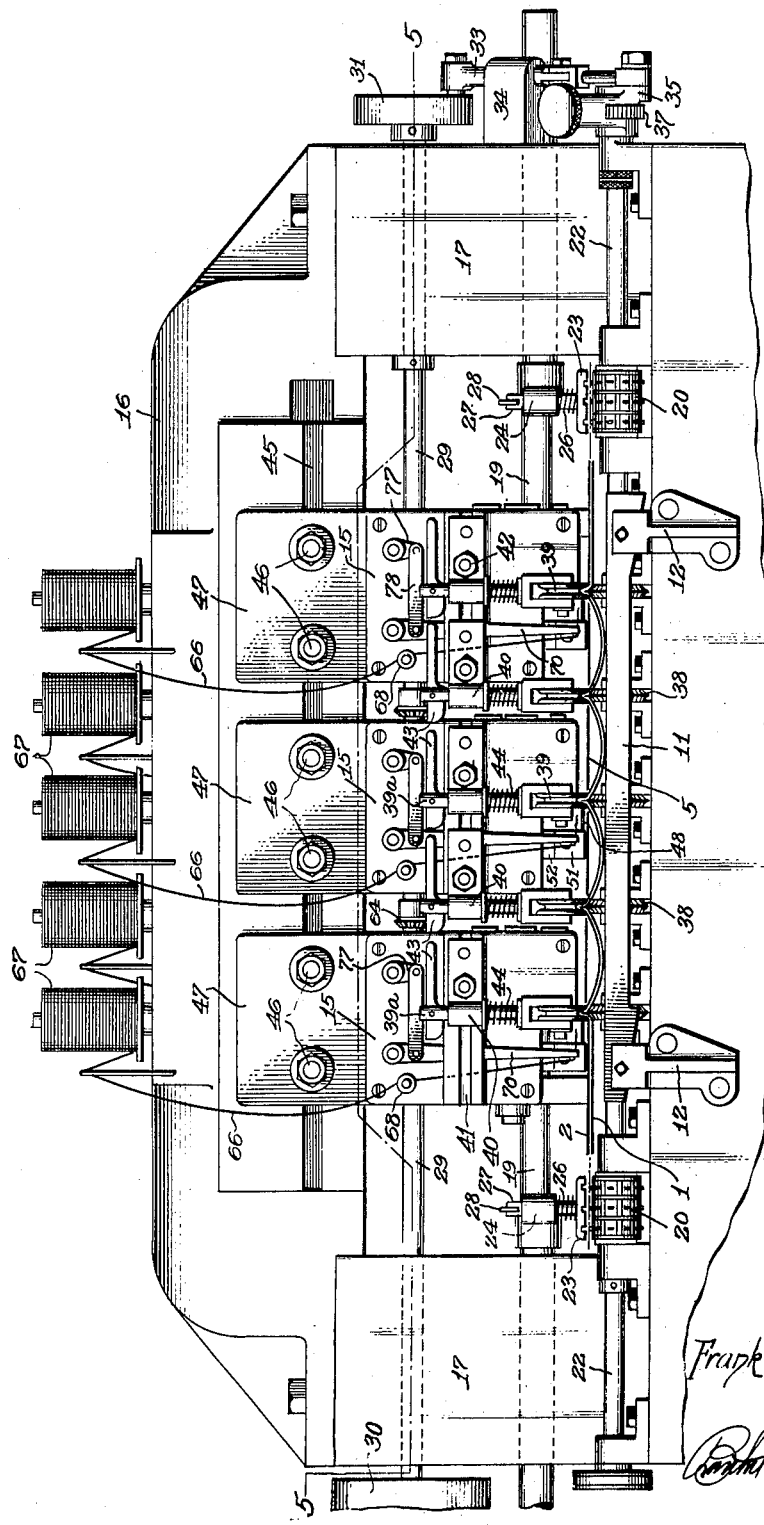

The machine shown in the accompanying drawings is illustrative of a mechanism for manufacturing upholstery of the type known as "tubular" in which the tufts or padded portions are constructed by sewing the covering and lining materials together along parallel lines to form the "tubes," and filling these tubes with a suitable padding. The method commonly employed is to stitch the outer fabric and lining together along parallel lines by means of suitable sewing machines and then placing the padding in the fabric tubes thus formed. But it is difficult to insert the padding evenly and smoothly and the process is slow and cumbersome.

The present invention aims to facilitate manufacture and give a better product by providing a machine adapted to sew a plurality of parallel seams and simultaneously lay a padding strip in each fabric tube formed between the seams, making the operation continuous to make fabricated upholstery strips of any desired length, suitable guiding means being provided for the fabric lining and covering to give the desired fullness of covering relative to lining, and also guiding means for the padding strips to guide and lay the same in place as the sewing progresses, suitable feeding means being also provided for feeding the material through the machine in timed relation to the sewing operation. The present invention also contemplates the simultaneous formation of any desired number of tubular padded portions of the desired width and according to the width of upholstery desired, and the formation of novel seams, whereby repair is facilitated.

As illustrated in Fig. 15 of the drawings, the upholstery which is the product of the machine embodying the invention, comprises a lining $a$ of suitable fabric, an outer fabric covering $b$ and padding strips $c$ placed within the fabric tubes formed by sewing the covering and lining together in parallel seams $d$ extending longitudinally of the fabric yardage. These seams $d$ are formed by bringing the lining and covering together, creating a fold with the covering doubled upon itself within the folded lining, thus forming a rib projecting from the inner face of the upholstery and then sewing the materials together by a line of stitches $e$ passing through the rib parallel with the plane of the face of the lining. These seams thus project from the inner or lining side of the upholstery and should the stitching rip, a repair may be made without such repair showing upon the outside of the upholstery, and the seams and stitching are effectually concealed as both lie at the inner side of the upholstery.

In order that the upholstery may have the desired tubular tufted appearance, it is necessary that the covering material be secured to the lining with considerable fullness between the seams, and to give this fullness relative to the lining, the machine is provided with suitable forming guides which hold the covering smooth with the proper outer curvature in cross-section between the seams and to also double the covering upon itself along the seams preparatory to stitching. Suitable guides are also provided for holding the lining material smooth and in place relative to the covering and for laying the lining over the doubled-over lines of the covering, in place to properly form the seams for stitching through the projecting cloth ribs thus formed upon the inner surface of the upholstery.

Figure 2:
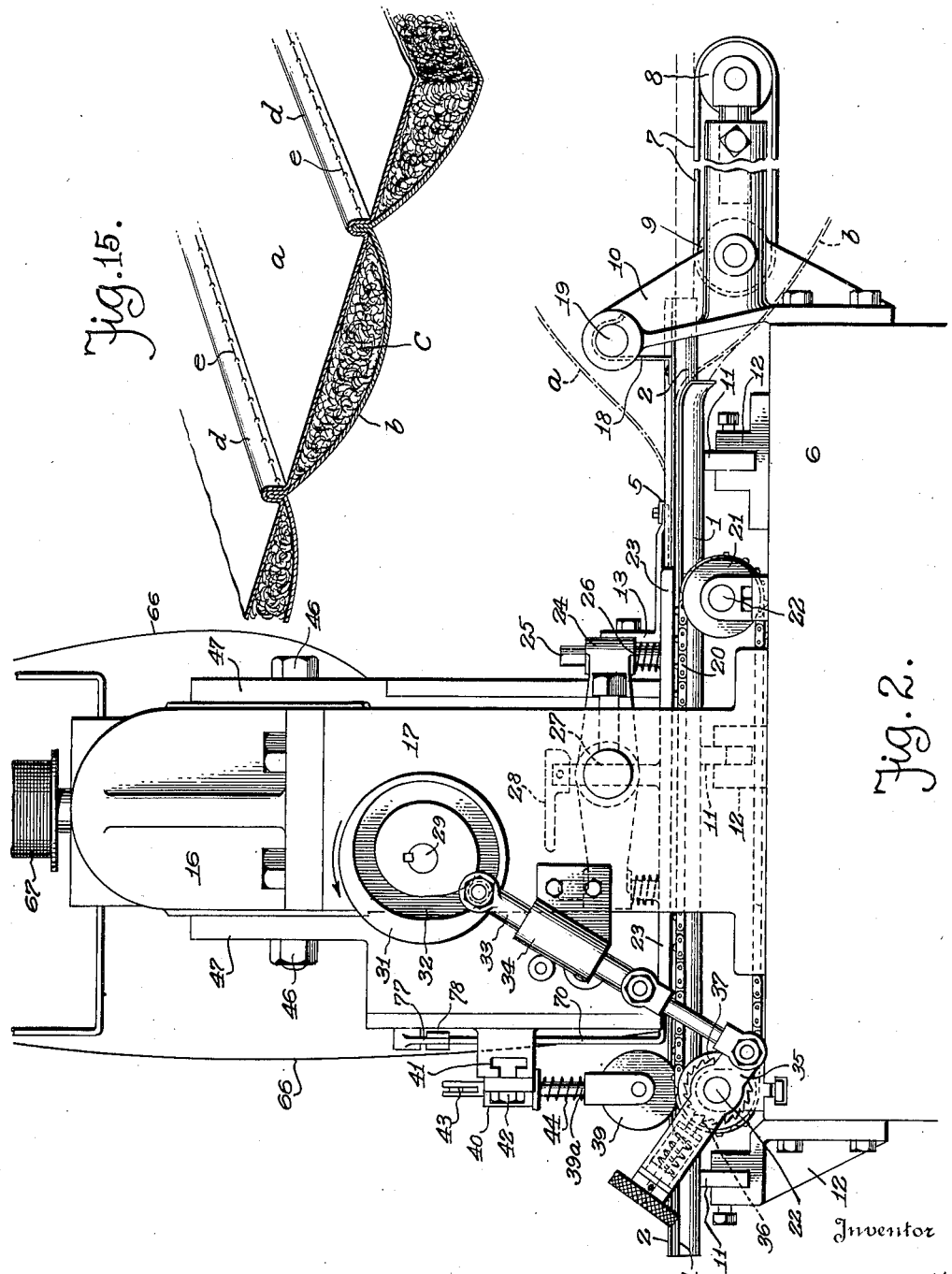
Figure 4:
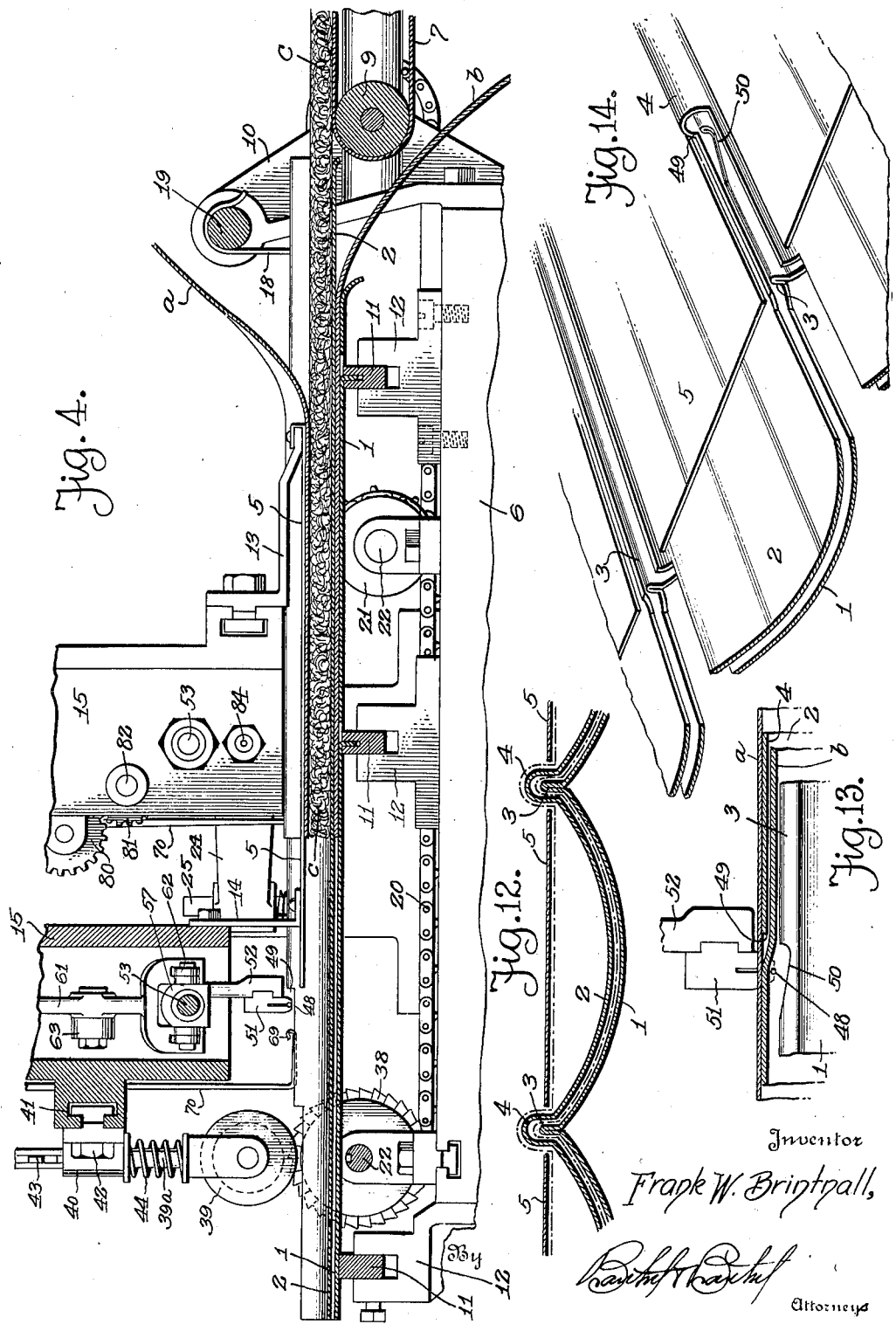
Fig. 4 is a longitudinal section substantially upon the line 4—4 of Fig. 5.

As shown in detail in Figs. 12, 13, and 14, and in side elevation and longitudinal section in Figs. 2 and 4 respectively, the guide for the covering $b$ comprises parallel spaced sheet metal plates 1 and 2 between which the covering material is fed, said plates being formed with portions curved in transverse section to conform to the desired curvature of the outer face of the upholstery, said plate 1 being folded upon itself at the meeting lines of the several curved portions, to form an upstanding rib 3 and the plate 2 is formed with upstanding hollow ribs 4 of substantially U-shape in cross-section to extend over the ribs 3 with a space between the inner surface of each hollow rib and its cooperating rib on the plate 1. The covering material is thus given the desired form in cross-section, and held and guided in passing through the space between said plates, the material being folded upon itself longitudinally by the ribs 3 and 4 to form the folds of the seams $e$ in the covering material.

The lining material $a$ is stretched, guided and held in spaced relation to the covering by providing a series of comparatively short lining guide plates 5 which are substantially flat and are supported between the ribs 4 with narrow spaces between their longitudinal edges and the sides of the ribs so that the lining material $a$ may extend beneath each plate in contact with its lower surface, through the spaces between the edges of the plates and the sides of the ribs 4, and over said ribs, thus laying the lining horizontally upon the padding strips $c$ which are fed longitudinally into the several tubular guides formed by the upper surface of the curved portions of the plate 2 and the under surface of the several plates 5. At the same time the lining is formed over the several ribs 4 to form the longitudinal folds therein embracing the folds in the covering and which folds in covering and lining together form, when stitched together, the seams $e$ between the several padded portions of the upholstery.

In the machine illustrative of the invention, these guides for the material are mounted upon a suitable base or supporting frame 6 in a substantially horizontal position, extending from the front toward the rear end of the machine so that the lining and covering material in the form of yardage may be fed from bolts or rolls of the material (not shown) into the forward open ends of these guides, and the padding in strips of a width to correspond to the width of the several guide tubes, fed into these tubes or spaces between the curved inner surfaces of the plate 2 and the plates 5, simultaneously with the feeding of the fabric. The padding strips $c$ are fed into the tubular guides by means of a continuous feed belt or carrier 7 passing around rollers 8 and 9 mounted upon suitable brackets 10 on the forward end of the frame 6. The upper run of the feed belt extends substantially in the horizontal plane of the plate 2 to feed the padding strips directly upon the forwardly projecting end of this plate within the channels or curved portions thereof between the ribs 4, and the fabric covering and lining are fed from below and from above, into the space between the plates 1 and 2 and beneath the plates 5, respectively.

The bottom plate 1 of the guide is carried by transverse supporting bars 11 mounted in slotted brackets 12 on the frame 6 so that said bars may be raised or lowered in said slots to raise or lower the plate 1 relative to the plates 5, said plates 5 being rigidly supported in a horizontal position by brackets 13 and 14 which are adjustably and detachably attached to sewing machine heads hereinafter described, and indicated as a whole by the numeral 15, said heads being in turn adjustably supported by a supporting frame member 16 mounted at its ends upon standards 17 secured at their bases upon the machine base frame 6 at each side of the guides formed by said plates 1, 2 and 5, to suspend the heads 15 with their lower ends in spaced relation to and above said guides and hold the plates 5 in place above and in spaced relation to the other plates. The plate 2 which lies between the fabric covering and padding is held in place by hooks 18 engaging a rod 19 carried by upwardly extended ends of the brackets 10, so that said plate will be held against longitudinal movement and will be free to rise and fall, serving as a spacer between the covering and padding, the surface of said plate being a smooth polished surface over which the material will slide freely.

The raising or lowering of the plate 1 of the guides by the vertical adjustment of its supporting bars 11 will therefore provide for different thicknesses of fabric and padding, and by the removal of the plates 1 and 2 and the substitution of others therefor, the width of the tubes or spaces between the seams may be varied as desired, the plates 5 being also adjusted or removed and replaced by others.

The feeding the covering, lining and padding material through the guides therefor, in timed relation to the operation of the sewing mechanism hereinafter described, is effected by means of a pair of endless carriers or chains 20 of any suitable form passing over sprockets 21 on shafts 22 mounted in suitable bearings on the base frame 6 at each side of the guides formed by the plates 1, 2 and 5, these chains being positioned to engage the under side of the free side edges of the covering material, and suitable presser feet 23 are provided to oppose the upper side of the upper run of the chains and press downwardly upon the free side edges of the lining material to yieldingly clamp said edges of the lining and covering between the feet and chains so that said chains will engage the material with sufficient force to accurately and positively feed the fabric through the guides. These feet 23 are each carried by a cross bar 24 rigidly mounted in any suitable manner upon an adjacent standard 17 and provided with a bearing opening at each end to receive vertical guide studs 25 on each presser foot, coiled springs 26 being sleeved upon said studs between the foot and bar to yieldingly press each foot into contact with the edge portion of the fabric passing over the chains. An intermediate stud 27 on each foot is arranged to slide in an opening in the bar 24 and a hand operated cam lever 28 is pivoted upon the upper end of the stud to be turned into engagement with the upper side of said bar and lift the foot away from the feed chain, against the action of the springs 26, for the purpose of permitting the ready insertion of the fabric in starting the same through the machine.

Power is supplied for driving these feed chains or carriers 20 in timed relation to the operation of the sewing mechanism hereinafter described, by providing a main driving shaft 29 which is mounted in suitable bearings on the pillars or standards 17, said shaft extending transversely of the machine between the two transverse rows of sewing machine heads 15 and being provided with a driving pulley 30 at one end. At its opposite end, said shaft is provided with a cam disk 31 having a cam slot 32 therein engaged by a roller or pin on the end of a rod 33 which is guided in a guide bearing 34 on the adjacent pillar 17 with the lower end of said rod pivotally connected to an arm 35 free to rotate upon the end of one of the transverse shafts 22 carrying the sprockets for the chains 20, said arm 35 carrying a pawl 36 to engage a ratchet wheel 37 secured upon the shaft so that intermittent motion will be imparted to the shaft 22 in one direction only from the main driving shaft 29. An intermittent movement is thus imparted to one of the shafts 22 to impart an intermittent travel to the feed chains 20 in timed relation to the operation of the sewing mechanism which is also driven by motion transmitted from the main driving shaft. The lining and covering materials are therefore automatically fed through the machine, and by the engagement of the lining with the padding strips b, said strips are also fed into place in the fabric tubes which are formed by the guides to receive them.

To further insure the even feeding of the material throughout the width of the upholstery strip, a series of toothed wheels 38 is secured upon the shaft 22 which is located at the rear of the machine in the direction of the travel of the material therethrough and preferably rearwardly of the sewing machine heads 15, said wheels 38 being so spaced as to engage within the creases in the covering formed by the formation of the seams, and opposed to these toothed feed wheels 38 are grooved rolls 39 to engage the upper side of the formed seams, thus holding the finished product in contact with the feed wheels along each seam to impart a positive feed or pull upon the upholstery along each seam after the sewing of the several seams has been completed. These several rolls 39 are held in yielding contact with the material to yieldingly clamp it between the rolls and feed wheels 38, by mounting each roll upon the lower end of a vertical bar or rod 39ª which is slidable in a bearing 40 adjustably secured to the adjacent side of the rear row of machine heads 15 by providing an undercut or T-groove 41 in a projecting rib on said heads to be engaged by T-headed bolts 42 for securing the bearing members in place. Pivotally attached to the upwardly projecting ends of the rods 39ª are hand operated cam levers 43 so that by turning said levers to bring their cam ends into engagement with the upper ends of the bearings 40, said rods will be moved upwardly against the action of coiled springs 44 sleeved upon the rods between the lower ends of the bearings and shoulders on said rods, to raise said rolls out of contact with the work in starting the material through the machine, said springs serving to normally hold the rolls in yielding contact with the work when the levers are in inoperative position as shown in Figs. 1, 2 and 4.

Figure 3:
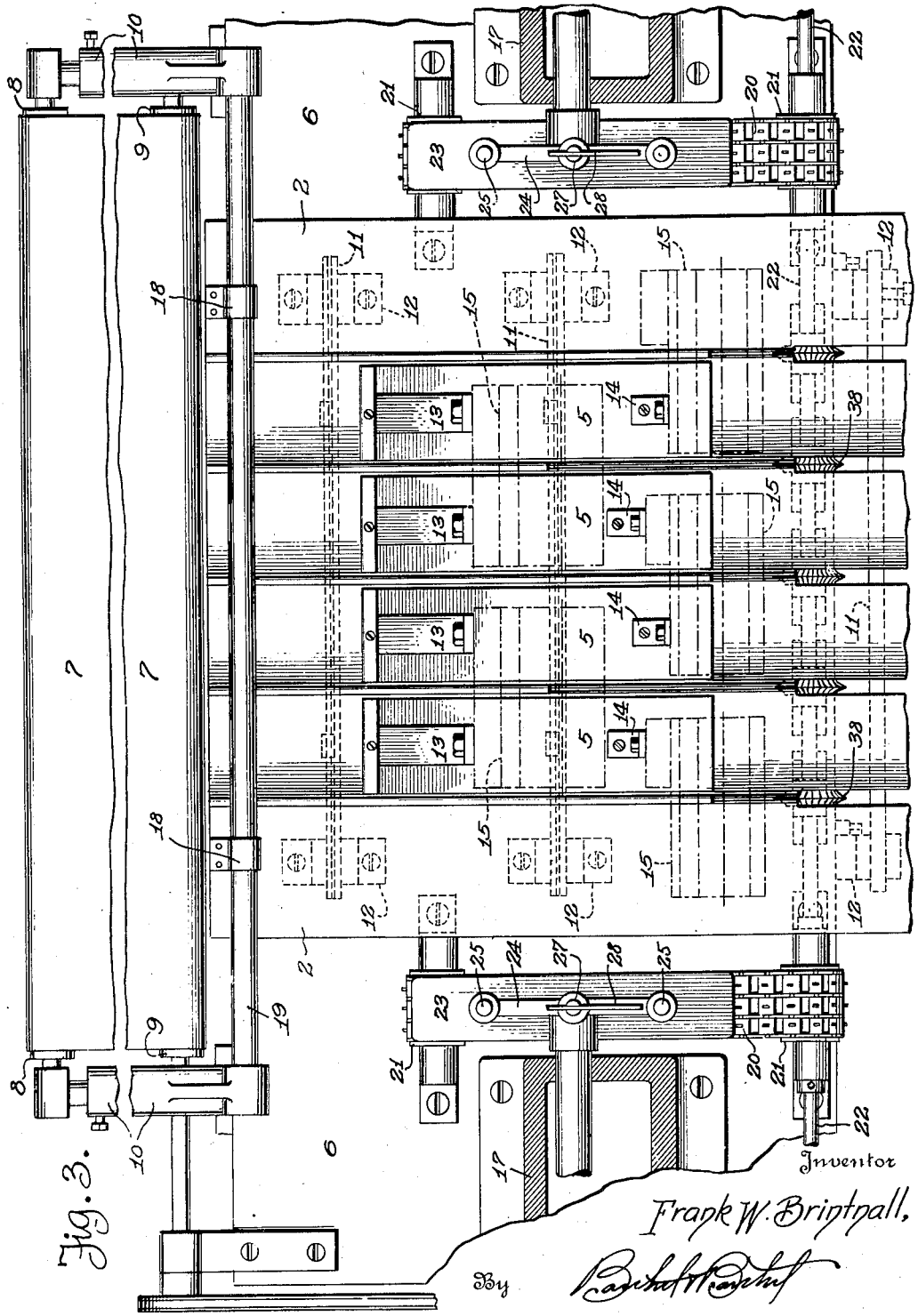

The sewing mechanism comprises a plurality of sewing machine heads or casings 15 and these heads are arranged in two transverse parallel rows, the heads of one row being arranged in staggered relation to the heads of the other row, as indicated in dotted lines in the plan view shown in Fig. 3. This arrangement permits of sewing seams which are spaced a comparatively short distance apart and also provides for a compact arrangement of heads so that the seams may be sewed as the material is passed but once through the machine. Finished upholstery of the desired width and having the desired number of tubes or longitudinal tufts may therefore be produced in a continuous strip, the several casings or heads 15 being adjustably secured to the bridge or cross bar 16 which is supported at its ends upon the upper ends of the pillars 17, so that said heads may be separately adjusted transversely of the machine to vary the distances between seams and to so attach said heads to said bridge, the opposite sides of the bridge are each formed with a longitudinal undercut or T-slot 45 to receive the heads of bolts 46, which bolts pass through holes in an upwardly extending flange 47 on each casing 15 adapted to seat against side surfaces of the bridge 16. These several sewing machine heads or casings 15 are thus suspended from the bridge 16 with their lower ends spaced from the guides for the fabric and padding and are independently adjustable along said bridge. A space is thus provided from front to rear of the machine between the pillars 17 supporting the bridge 16 in which the guides are located for guiding the material therethrough in continuous strips.

The sewing mechanism carried by each head or casing 15 as shown in detail in Fig. 4 to 11 inclusive, includes a horizontally disposed needle 48 arranged to transversely pierce the upstanding rib of fabric or folded portions between the guide plates 5, the upstanding U-shaped ribs 4 of the guide plate 2 being cut away as at 49, (Figs 8, 13 and 14) and the upstanding ribs 3 on the plate 1 being notched as at 50 to permit the formation of the lines of stitching e well down upon the upstanding folded lines of covering and lining and permit the finished upholstery to pass on out of the rear open ends of the guides. The needle 48 of each sewing mechanism is carried by a clamping plate 51 (see Figs. 7 and 8) adjustably secured to the lower end of a vertical arm 52 which is integral with a horizontally reciprocable slide comprising a rod 53 slidable in bearing bushings 54 and 55 mounted in openings of the walls of the head or casing 15, said rod being guided and held against rotation by splines 56 in the bushing 55 and the arm 52 being integral with an enlargement 57 on the rod. Reciprocating motion is imparted to this slide to project the needle through the rib of fabric and retract it therefrom, by a cam wheel 58 having a cam groove 59 to be engaged by a pin or roller 60 on the end of a bell crank lever 61 having a forked lower end to embrace the enlargement 57, said forked end of said lever being pivotally connected to the enlargement by links 62 so that upon rotation of the cam disk 58 the bell crank lever 61 will be turned upon its pivotal support 63 and the slide reciprocated, the cam groove 59 being so formed as to quickly project and retract the needle and to cause a dwell in the retracted position of its movement. Motion is imparted to the cam disk 58 from the main driving shaft 29 by means of a bevel gear 64 on said shaft in mesh with a like bevel gear on a stub shaft 65 to which the disk 58 is secured, said stub shaft being mounted in a bearing on the inner wall of the head or casing 15.

The thread 66 (see Fig. 1) which passes through an eye in the pointed end of each needle 48 in the usual manner, is fed from a series of spools 67 mounted upon the bridge 16, passing through tensioning devices 68 of any suitable construction and through the hooked ends or eyes 69 (Figs. 8 and 9) of suitable tension or take-up arms 70 which are pivotally attached at their upper ends to the outer side of the rear walls of the casings 15 and are swung upon their pivots in timed relation to the sewing operation by means of disk cams 71 (see Figs. 7 and 9) each having a properly shaped cam groove 72 engaged by a pin or roller on the lower end of a vertically guided rod 73 within each casing, and to the upper end of each of which rods is connected by a link 74, an arm 75 on the inner end of a stub shaft 76 extending through the wall of the casing, the outer end of said stub shaft being provided with an arm 77 connected by a link 78 to the take-up lever 70 so that the take-up lever will be swung in timed relation to the sewing operation to take up the slack in the thread and pull the stitches tight, the cam groove 72 being properly formed to give the proper timing. Motion is transmitted to each of the cam disks 71 from the main driving shaft 29 by means of a spur gear 79 secured upon said shaft and which gear is in mesh with idler gears (see Fig. 9) mounted upon stub shafts having suitable bearings on adjacent casings in the front and rear rows of casings to transmit motion to like gears 81 in each casing and which gears 81 are secured upon the stub shafts 82 upon which the said cam disks 71 are mounted. Motion for operating the take-up of each sewing mechanism is therefore taken from the main driving shaft so that the operation of the take-up will be synchronized with the other operations of the machine.

The shuttle thread, which in the usual and well known form of stitching is passed through a loop in the needle thread, is carried in the usual manner by an old and well known form of rotary shuttle, which shuttle in each of the sewing mechanisms is indicated as a whole by the numeral 83 and shown in full lines in Figs. 7, 10, and 11 and in dotted lines in Fig. 9. Each of these rotary shuttles is mounted to rotate freely upon a stud 84 (see Fig. 7), on the casing and the shank or spindle of each shuttle is in the form of a gear 85 or formed with gear teeth to mesh with an idler 86 in each casing mounted to rotate freely upon the bushings 54 and transmit motion from the gears 81 which drive the cam disks 71, so that rotary motion will be transmitted directly from the main driving shaft 29 to the shuttles through the trains of gearing comprising the gears 79, 80, 81, 86 and 85, motion being transmitted laterally from the gears 79 in both directions into the front and rear rows of casings or heads 15 from the central main driving shaft 29, and the gears 79 are splined upon the driving shaft 29 to turn therewith and free to slide longitudinally thereon so that when the sewing machine heads or casings 15 are adjusted upon the bridge 16 to vary the distance between the seams of the upholstery, these gears 79 may be correspondingly adjusted. To hold each gear against movement longitudinally of the shaft 29 when in adjusted position, set screws 87 are provided, and similar set screws are provided for holding the beveled gears 64 in adjusted position on said shaft. To support said main driving shaft 29 intermediate its ends, a bearing bracket 88 is provided, said bracket being adjustable longitudinally of the shaft by providing a longitudinal T-slot 89 in the lower side of the bridge 16 directly above the shaft and securing said bracket to the bridge by bolts having heads engaging said slot (see Figs. 6 and 9).

The rotary shuttles 83 illustrated, are of an old and well known type embodying an outer casing 90 which is continuously rotated by the gear train as previously described, said casing being provided with a hook 91 (see Figs. 10 and 11) to engage within a loop of the needle thread, which loop is carried through the fabric by the needle, and also embodying a non-rotative bobbin carrier 92 within which the bobbin or thread spool (not shown) is inclosed. To prevent rotation of the bobbin carrier 92 relative to the casing 90, the usual lug 93 is provided and this lug is engaged within a notch in a lug 94 on a plate 95 extending transversely to the axis of the shuttle and spaced a short distance from the end thereof. This plate is detachably secured in place against the walls of the casing by means of screws 96 and forms a support for an opposed guide and clamping plate 97, said plate 97 being connected to the upper edge of the plate 95 to swing toward and from the fixed plate at its lower end and thus clamp or pinch the folded material forming the seam, adjacent the needle, said plates 95 and 97 being each notched at their lower edge to permit the needle to pass therethrough in sewing the seam. The clamping plate 97 is yieldingly forced toward the plate 95 to pinch the fabric rib, by providing a screw-threaded stem 98 on the fixed plate, which stem passes through an opening in the movable plate, and sleeved upon this stem between the movable plate and a nut 99 on the stem is a coiled spring 100 (see Fig. 7). Tension of the spring may be varied by turning the nut to vary the gripping or pinching effect of the plates upon the upstanding seam as the material is fed through the guides, thus pressing the thicknesses of fabric together and making a tight seam as well as affording a support for the upstanding rib of fabric so that it will not be deflected laterally by the needle, thus insuring an even line of stitching.

By carrying the entire sewing mechanism for sewing each seam, within a single casing or head, adjustment of seam spacing is greatly facilitated and as these heads are removable and replaceable any desired number may be used according to the number of seams desired in the width of the fabric. The work of manufacturing upholstery of the character described is greatly facilitated as the lining, covering and padding materials may all be automatically fed into the machine and will pass therefrom in a continuous strip of finished product without the necessity for marking or cutting the material, and the sewing and stuffing operations are automatically performed with the maximum of accuracy. The manner in which the seams are constructed also greatly facilitates repair of the upholstery, as these seams project from the inner face of the upholstery where a rip in the sewing may be quickly remedied by sewing through the upstanding rib of material without disturbing the covering and where the repair will not be apparent.

For the purpose of illustration, a particular form of sewing mechanism has been shown, but it will be obvious that any suitable form of such mechanism may be employed. It is also obvious that other changes may be made in the construction and arrangement of parts within the scope of the appended claims without departing from the spirit of the invention, and I do not therefore limit myself to the particular construction shown.

Having thus fully described my invention, what I claim is:—

1. In a machine of the character described, the combination of guiding means for guiding covering and lining materials and comprising spaced plates one of which is curved to hold materials in spaced relation between longitudinal parallel lines and formed along said lines to bring said covering and lining materials into contact along said lines and form upstanding ribs, sewing mechanism for simultaneously sewing the materials together and in contact with each other along said upstanding ribs, means for guiding a strip of filling material into the space between said materials and between the parallel lines of stitching simultaneously with the stitching operation, and means for feeding the materials to the stitching mechanism in timed relation to the stitching operation.

2. In a machine of the character described, the combination of sewing mechanism for simultaneously sewing a plurality of parallel seams, a guide for guiding covering material comprising inner and outer transversely curved plates with longitudinal ribs along the edges of the curved portions and between which plates the material is adapted to pass, and a guide for lining material comprising a substantially flat plate extending across the curved portion of the inner plate with its edges adjacent said ribs and beneath which flat plate and over said ribs, the lining material is passed, said flat plate and inner guide plate forming between them a tubular guide for filling material, and means for feeding the covering and lining materials and a filling material in timed relation to the operation of the sewing mechanism.

3. In a machine of the character described, the combination of sewing mechanism for sewing a plurality of parallel seams, fabric guides for a covering material comprising parallel spaced plates curved transversely to form a channel and each provided with a rib at each side of said channel with the ribs on the inner plate formed hollow to receive the ribs on the outer plate, the walls of said ribs being spaced apart to receive the covering material between them and form the same into upstanding fabric ribs with a fullness in the covering material between the ribs, and a guide plate positioned above said guide channel to guide a fabric lining, said plate being positioned with its edges spaced from said ribs on said adjacent plate to form the lining material over the fabric ribs of the covering material, said sewing mechanism being arranged to sew the upstanding fabric ribs transversely, to unite the covering and lining materials in seams at each side of the fabric tube formed between the seams by said guide channel.

4. In a machine of the character described, the combination of sewing mechanism for sewing inner and outer fabrics together along parallel spaced seams, a guide for the outer fabric, curved transversely to provide a guide channel and to provide a fullness in the outer fabric between the seams, and a guide for the inner fabric extending across the channel to form a top for said channel, said guide for the outer fabric being formed to fold the inner and outer fabrics into upstanding ribs to be sewed by the sewing mechanism to form the seams, and said channel in the guide for the outer fabric and said guide for the inner fabric being arranged to hold said fabrics in spaced relation between the seams to provide a fabric tube for the reception of a filling material.

5. In a machine of the character described, the combination of sewing mechanism for sewing a covering and lining material together along parallel spaced seams, means for guiding the covering material comprising spaced parallel plates curved transversely to form a channel at the upper side thereof, and a guide for the lining material spaced from said plates and extending across said channel to receive a filling material between the guides, said guides being arranged to form the covering material into upstanding ribs, one at each side of the channel with the lining material superposed upon said ribs, said sewing mechanism being arranged to sew transversely, the upstanding ribs thus formed, and means for feeding the covering and lining materials in timed relation to the operation of the sewing mechanism.

6. In a machine of the character described, the combination of sewing mechanism for simultaneously sewing parallel spaced seams, and guiding means for guiding and holding covering and lining materials and a filling material, comprising a plurality of spaced plates with two other plates formed to guide and hold the covering material and form a fullness therein between the seams, the inner of said plates being free to move toward and from the outer plates and the outer plate being adjustably held for adjustment toward and from the other plates, and means for feeding the covering and lining materials and a filling material, in timed relation to the operation of the sewing mechanism.

7. In a machine of the character described, the combination of guiding means for guiding and forming covering and lining materials, and sewing mechanism for simultaneously sewing the covering and lining materials together along parallel spaced seams, said sewing mechanism comprising a plurality of heads adjustable toward and from each other to vary the spacing between the lines of stitching, each head carrying a horizontally disposed needle, a shuttle and driving mechanism for said needle and shuttle.

8. A machine of the character described, the combination of sewing mechanism comprising heads adjustable toward and from each other to vary the spacing between the lines of stitching, each head provided with means for sewing a longitudinal seam, guides for covering and lining materials and a filling material to be placed between the covering and lining and between the longitudinal seams, said guides being formed to fold the covering and lining materials together along the lines of the seams and to provide a fullness in the covering material between the seams, and means for feeding the covering and lining materials and the filling material in timed relation to the operation of the sewing mechanism.

9. In a machine of the character described, the combination of sewing mechanism for sewing a plurality of longitudinal spaced parallel seams, said sewing mechanism comprising heads independently adjustable toward and from each other to vary the spacing between the lines of stitching and each head carrying means for sewing a seam, a single drive shaft, means adjustable on said shaft adjacent each head for transmitting motion from said shaft to all of said heads for driving the seam forming means carried by each head, and means for feeding material to the sewing mechanism in timed relation to the operation thereof.

10. In the machine of claim 9 and wherein said heads are arranged in parallel transverse rows with the heads in one row arranged in staggered relation to those of an adjacent row.

11. In a machine of the character described, the combination of sewing mechanism for sewing a plurality of longitudinal spaced upstanding parallel seams, said sewing mechanism comprising a plurality of heads each carrying a horizontally disposed needle, and means for operating the same, means for guiding the material to the sewing mechanism comprising guides for covering and lining materials and for a filling material, said guides being formed to fold the covering and lining material together along the lines of the seams and form upstanding fabric ribs with a fullness in the covering material between the lines of the seams and to guide said filling material to place between the covering and lining and between adjacent seams.

12. In a machine of the character described, the combination of guides for forming and holding covering and lining materials with an upstanding fabric rib along each stitching line projecting above the plane of the upper lining, a filling material, means for feeding the covering, lining and filling materials through said guides, and sewing mechanism supported in spaced relation to and above said guides and including horizontally reciprocable needles arranged to pierce and sew the upstanding ribs as the material passes through said guides.

13. A machine of the character described, the combination with means for forming and guiding covering and lining materials and bringing said materials together in a plurality of upstanding spaced parallel ribs and for forming a fullness in the covering material between adjacent ribs, sewing mechanism comprising separate heads each provided with mechanism for sewing an upstanding rib transversely, means for feeding the covering and lining materials through said guiding means and to the sewing mechanism, and means for driving said sewing mechanism and said feeding mechanism in timed relation, one to the other.

14. In a machine of the character described, the combination of sewing mechanism comprising a plurality of heads each provided with means for forming a seam, means for guiding and holding material to be fed to said sewing mechanism in a continuous strip, and means for feeding the material through said guiding means to the sewing mechanism, comprising endless carriers arranged at each side of the path of movement of the strip of material and adapted to engage said strip adjacent its side edges.

15. In a machine of the character described, the combination of sewing mechanism for simultaneously sewing parallel spaced seams, means for forming and guiding covering and lining materials and a filling material, said means being arranged to form a fullness for the covering material between the lines of the seams to provide a plurality of fabric tubes for receiving the filling material, and means for feeding the covering and lining materials in timed relation to the operation of the sewing mechanism, said feeding means including endless carriers, one arranged at each side of the guiding means, and sewing mechanism to engage the covering material adjacent its longitudinal side edges, and means for holding the edge portions of the covering and lining materials in contact with said endless carriers.

16. In a machine of the character described, the combination of a supporting base, guiding means supported upon said base and arranged to form and guide continuous strips of covering and lining materials and separate strips of filling material, said guiding means being arranged to bring the covering and lining together along longitudinal parallel lines with the filling material between the covering and lining and between said lines, supporting means mounted on the base and spanning said guiding means, and sewing mechanism carried by said supporting means, said sewing mechanism including a plurality of separate heads separately adjustable along said supporting means and each head carrying mechanism for sewing a seam.

17. In the machine of claim 16, and including feeding means for the materials carried by the base at each side of the guiding means to engage the side edge portions of the material, and feed the same through the guiding means to the sewing mechanism, said feeding means also including rotatable feeding members arranged rearwardly of the sewing mechanism in the direction of travel of the material, said feeding members being arranged to engage the material along the several lines of the seams formed by the sewing mechanism.

In testimony whereof I affix my signature in presence of two witnesses.

FRANK W. BRINTNALL.

Witnesses:
ANNA M. DORR,
LEWIS E. FLANDERS.